United States Patent
Leung et al.

(10) Patent No.: US 6,513,034 B1
(45) Date of Patent: Jan. 28, 2003

(54) DERIVING UNIQUENESS FOR INDICES ON SUMMARY TABLES

(75) Inventors: Ting Yu Leung, San Jose, CA (US); David E. Simmen, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/469,711

(22) Filed: Dec. 21, 1999

Related U.S. Application Data

(60) Provisional application No. 60/129,778, filed on Apr. 16, 1999.

(51) Int. Cl.$^7$ .............................................. G06F 17/30
(52) U.S. Cl. .............................................. 707/3; 707/2
(58) Field of Search ......................................... 707/2, 3

(56) References Cited

U.S. PATENT DOCUMENTS

| | | | |
|---|---|---|---|
| 5,133,075 A | | 7/1992 | Risch .......................... 707/201 |
| 5,276,870 A | | 1/1994 | Shan et al. .................... 702/2 |
| 5,535,385 A | | 7/1996 | Griffin et al. ................... 707/3 |
| 5,600,831 A | | 2/1997 | Levy et al. ..................... 707/2 |
| 5,603,025 A | * | 2/1997 | Tabb et al. ..................... 707/2 |
| 5,615,361 A | * | 3/1997 | Leung et al. ................... 707/3 |
| 5,682,535 A | | 10/1997 | Knudsen ..................... 395/701 |
| 5,706,495 A | | 1/1998 | Chadha et al. ................. 707/2 |
| 5,761,653 A | | 6/1998 | Schiefer et al. ............. 704/223 |
| 5,822,750 A | * | 10/1998 | Jou et al. ....................... 707/2 |
| 5,963,933 A | * | 10/1999 | Cheng et al. ................... 707/2 |
| 5,991,754 A | * | 11/1999 | Raitto et al. ................... 707/2 |
| 6,105,020 A | * | 8/2000 | Lindsay et al. ................. 707/2 |
| 6,339,768 B1 | * | 1/2002 | Leung et al. ................... 707/2 |

FOREIGN PATENT DOCUMENTS

| | | | | |
|---|---|---|---|---|
| EP | 0079465 | * | 5/1983 | ........... G06F/14/40 |

OTHER PUBLICATIONS

L.S. Colby, R.L. Cole, E. Haslam, N. Jazayeri, G. Johnson, W.J. McKenna, L. Schumacher, D. Wilhite. Red Brick Vista: Aggregate Computation and Management. Proceedings of the 14$^{th}$ Int'l. Conference on Data Engineering, Orlando, FL, 1998, pp. 174–177.

R. Bello, K. Dias, A. Downing, J. Feenan, J. Finnerty, W. Norcott, H. Sun, A. Witkowski, M. Ziauddin. Materialized Views In Oracle. Proceedings of the 24$^{th}$ VLDB Conference, New York, 1998, 659–664.

D. Srivastava, S. Dar, H. Jagadish, A. Levy. Answering Queries with Aggregation Using Views. Proceedings of the 22$^{nd}$ VLDB Conference, Mumbai, India, 1996, 318–329.

H. Pirahesh, "Extensible/Rule Based Query Rewrite Optimization in Starburst", ACM SIGMOD Conference on Management of Data, vol., 21, No. 2, Jun. 1992, pp 39–48.

* cited by examiner

*Primary Examiner*—Charles L. Rones
(74) *Attorney, Agent, or Firm*—Gates & Cooper LLP

(57) ABSTRACT

A method, apparatus, and article of manufacture for optimizing a query by deriving uniqueness for indices on the summary tables. The query is analyzed to determine whether a summary table can be used to answer the query or a summary table is directly referenced in the query. A determination is made whether a non-unique index of the summary table is unique based on a query definition of the summary table. If the non-unique index of the summary table is unique, then query optimization techniques can be applied.

39 Claims, 5 Drawing Sheets

DERIVING UNIQUENESS FOR INDICES ON SUMMARY TABLES

CROSS-REFERENCE TO RELATED APPLICATIONS

This application claims the benefit under 35 U.S.C. §119 (e) of co-pending and commonly-assigned U.S. provisional application serial No. 60/129,778, entitled "DERIVING UNIQUENESS FOR INDICES ON SUMMARY TABLES", filed on Apr. 16, 1999, by Ting Y. Leung and David E. Simmen, which application is incorporated by reference herein.

BACKGROUND OF THE INVENTION

1. Field of the Invention

This invention relates in general to database management systems performed by computers, and in particular, to the optimization of queries using indices for summary tables.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Institute (ANSI) and the International Standards Organization (ISO).

For most RDBMS software, combinations of base tables and views are used to access data stored in the database. A view definition includes a query that, if processed, provides a temporary result table based on the results of the query at that point in time. Using an INSERT statement and an appropriately defined table in the database, the temporary results table can be stored in the database. To refresh this table, the user would need to perform a DELETE from the table and then perform the INSERT again.

Users can directly query against a table in this manner, provided that the users are aware how the results were derived. Generally, the RDBMS software is not aware that such a table is any different from any other table in the database. However, this table cannot be used by an optimizer within the RDBMS software to improve performance, even though the table may contain data that would drastically improve the performance of other queries.

This leads to the idea of summary tables (also known as materialized views) as envisioned by the present invention. These tables are similar to the created table described above, except that the definition of the table is based on a "full select" (much like a view) that is materialized in the table. The columns of the table are based on the elements of the select list of the full select.

Summary tables are important for query optimization in data warehouse applications. There are extensive research activities and literature on summary tables and materialized views, as disclosed in the following publications, all of which are incorporated by reference herein:

1. L. S. Colby, R. L. Cole, E. Haslam, N. Jazaeri, G. Johnson, W. J. McKenna, L. Schumacher, D. Wilhite. Red Brick Vista: Aggregate Computation and Management. Proceedings of the $14^{th}$ Int'l. Conference on Data Engineering, Orlando, Fla., 1998.
2. R Bello, K. Dias, A. Downing, J. Feenan, J. Finnerty, W. Norcott, H. Sun, A. Witkowski, M. Ziauddin. Materialized Views In Oracle. Proceedings of the $24^{th}$ VLDB Conference, New York, 1998.
3. D. Srivastava, S. Dar, H. Jagadish, A. Levy. Answering Queries with Aggregation Using Views. Proceedings of the $22^{nd}$ VLDB Conference, Mumbai, India, 1996.

So far, the state of the art has focused on query rerouting using materialized views and incremental maintenance of materialized views. However, there is increasing need to optimize queries through the use of indices, especially unique indices that are defined on base tables referenced in the materialized views.

SUMMARY OF THE INVENTION

To overcome the limitations in the prior art described above, and to overcome other limitations that will become apparent upon reading and understanding the present specification, the present invention discloses a method, apparatus, and article of manufacture for optimizing a query by deriving uniqueness for indices on the summary tables. The query is analyzed to determine whether a summary table can be used to answer the query. A determination is made whether an index of the summary table is unique based on a query definition of the summary table. During query optimization phase, proving the existence of a unique index on the summary table further enables query optimization. For example, proving uniqueness may allow an optimizer function to remove a sort requirement by proving the generalized 1-tuple condition based on the techniques described in U.S. Pat. No. 5,615,361, entitled "Exploitation of Uniqueness Properties using 1-Tuple Condition for the Optimization of SQL Queries", issued Mar. 25, 1997, to Ting Y. Leung et al., which patent is incorporated by reference herein. Similarly, proving index uniqueness may allow the optimizer to generate an efficient "early-out" plan when at most one row will be returned as the answer set.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown byway of illustration a specific embodiment in which the invention may be practiced. It is to be understood that other embodiments may be utilized and structural and functional changes may be made without departing from the scope of the present invention.

HARDWARE AND SOFTWARE ENVIRONMENT

Figure 1:
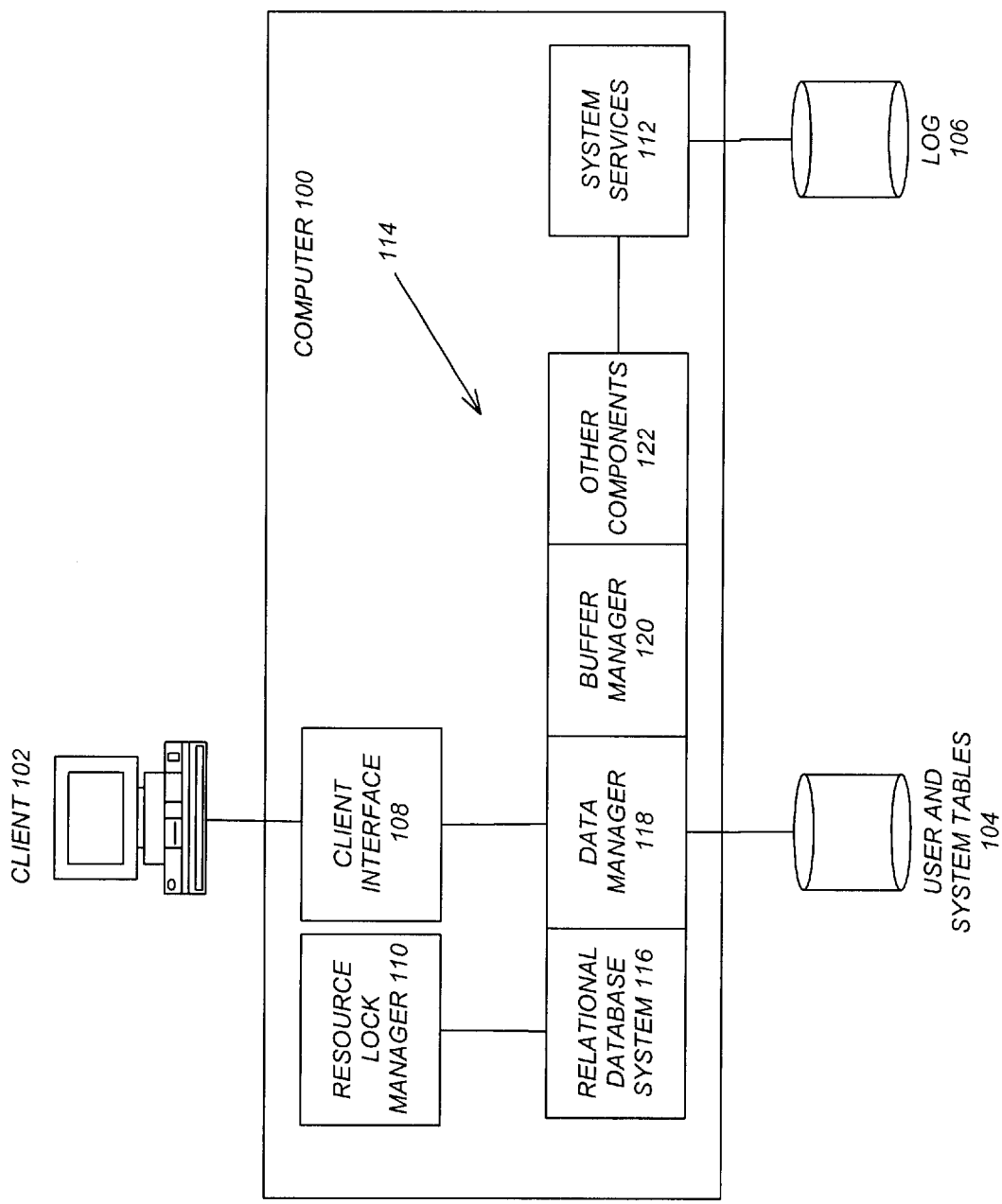
FIG. 1 illustrates the computer hardware environment of the present invention.

FIG. 1 illustrates an exemplary hardware and software environment that could be used with the preferred embodiment of the present invention. In the exemplary environment, a server computer 100 is connected to one or more client computers 102 or terminals. The server computer 100 executes a relational database management system (RDBMS) that manages user and system tables 104 and includes a system log 106. In the preferred embodiment of the present invention, the RDBMS comprises the DataBase 2 (DB2™) Universal DataBase (UDB™) product offered by IBM Corporation, although those skilled in the art will recognize that the present invention has application to any RDBMS. The client computers 102 interface to the RDBMS via a client interface component 108.

As illustrated in FIG. 1, the RDBMS includes three major components: the Resource Lock Manager (RLM) 110, the Systems Services module 112, and the Database Services module 114. The RLM 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS is the Database Services module 114. The Database Services module 114 contains several submodules, including a Relational Database System (RDS) 116, Data Manager 118, Buffer Manager 120, and Other Components 122 such as an SQL compiler/interpreter. These submodules support the functions of the SQL language, i.e., definition, access control, retrieval, and update.

Generally, the RDBMS comprises logic and/or data that is embodied in or retrievable from a device, medium, or carrier, e.g., a fixed or removable data storage device, a remote device coupled to the computer by a data communications device, etc. Moreover, this logic and/or data, when read, executed, and/or interpreted by the computer 100, cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" as used herein is intended to encompass logic and/or data embodied in or accessible from any device, carrier, or media.

Of course, those skilled in the art will recognize that many modifications may be made to this configuration without departing from the scope of the present invention. For example, those skilled in the art will recognize that any combination of the above components, or any number of different components, including computer programs, peripherals, and other devices, may be used to implement the present invention, so long as similar functions are performed thereby.

INTERACTIVE SQL EXECUTION

Figure 2:
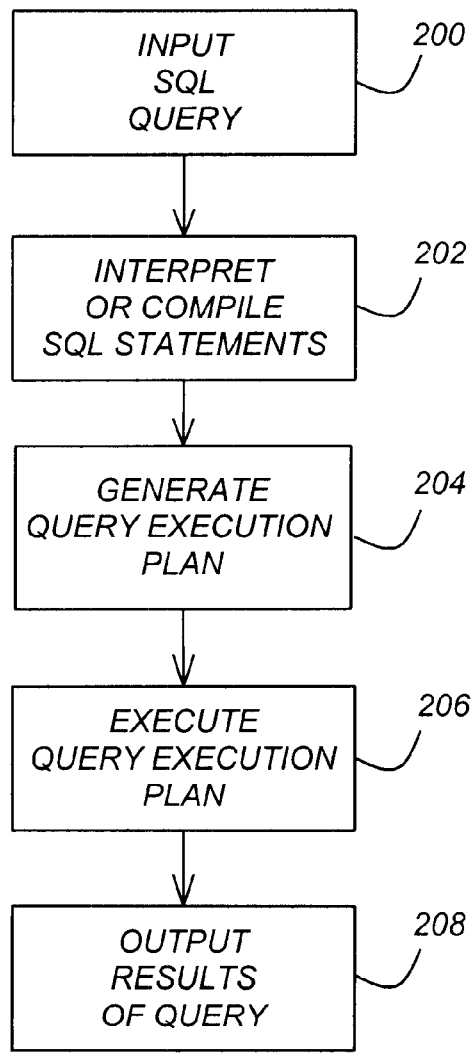
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 200 represents the input of SQL statements into the computer system 102. Block 202 represents the step of compiling or interpreting the SQL statements. Block 204 represents the step of generating a compiled set of runtime structures called a query execution plan from the compiled SQL statements. An optimization function at Block 204 may transform or optimize the SQL query in a manner described in more detail later in this specification. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 206 represents the execution of the query execution plan and Block 208 represents the output of the results.

EMBEDDED/BATCH SQL EXECUTION

Figure 3:
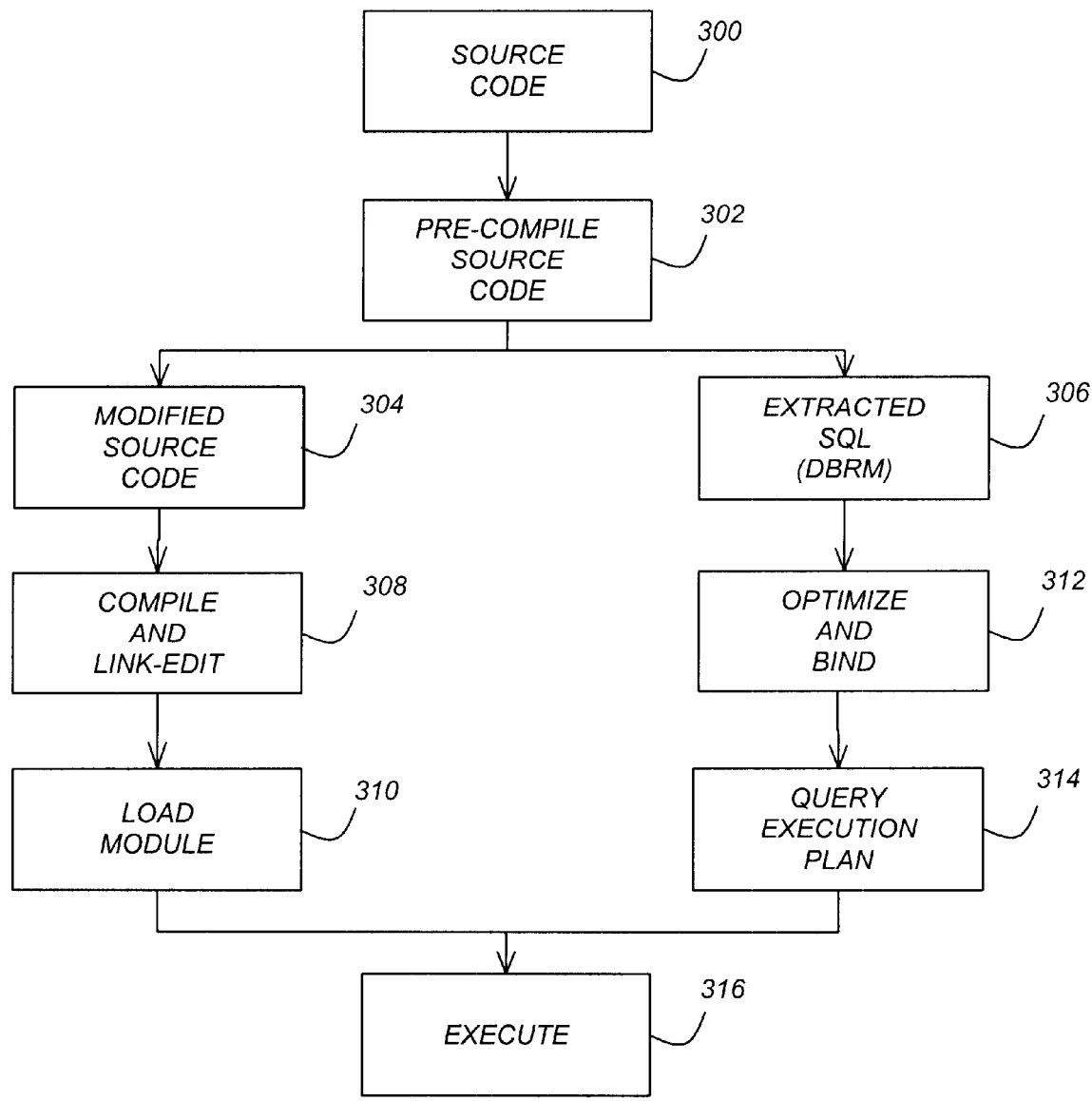
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 300 represents program source code containing a host language (such as COBOL or C) and embedded SQL statements. The program source code 300 is then input to a pre-compile step 302. There are two outputs from the pre-compile step 302: a modified source code module 304 and a Database Request Module (DBRM) 306. The modified source code module 304 contains host language calls to the RDBMS, which the pre-compile step 302 inserts in place of SQL statements. The DBRM 306 is comprised of the SQL statements from the program source code 300. A compile and link-edit step 308 uses the modified source code module 304 to produce a load module 310, while an optimize and bind step 312 uses the DBRM 306 to produce a compiled set of runtime structures for the query execution plan 314. As indicated above in conjunction with FIG. 2, the SQL statements from the program source code 300 specify only the desired data, but not how to retrieve the data. The optimize and bind step 312 may optimize the SQL query in a manner described in more detail later in this specification. Thereafter, the optimize and bind step 312 considers both the available access paths (indexes, sequential reads, etc.) and system held statistics on the data to be accessed (the size of the table, the number of distinct values in a particular column, etc.), to choose what it considers to be the most efficient access path for the query. The load module 310 and query execution plan 314 are then executed together at step 316.

DESCRIPTION OF THE OPTIMIZATION TECHNIQUE

The present invention discloses an improved optimization technique that is typically performed at step 204 of FIG. 2 or step 312 of FIG. 3. Specifically, the present invention discloses an improved optimization technique by deriving uniqueness for indices on summary tables.

The operation of the present invention can best be understood in context, i.e., using a real-world example, such as a data warehouse application performed by the RDBMS. Consider the following example that illustrates the need to: (1) optimize queries that directly reference summary tables; and (2) optimize queries using derived properties or information based on the query definition of the summary tables.

EXAMPLE 1

Consider the following example:
CREATE TABLE CREDIT_CARD (
   CARD_ID INT NOT NULL,
   NAME VARCHAR(30),
   CREDIT INT,
   STATUS VARCHAR(2));

```
CREATE UNIQUE INDEX UIDX ON CREDIT_CARD
    (CARD_ID);
CREATE TABLE HIGH_RISK_CARD AS (
    SELECT*
    FROM CREDIT_CARD
    WHERE STATUS IN ('HH', 'HI'))
DATA INITIALLY DEFERRED REFRESH
    DEFERRED;
CREATE INDEX IDX ON HIGH_RISK_CARD(
    CARD_ID, NAME, CREDIT);
```

The base table (CREDIT_CARD) stores information regarding credit cards, card holder name, credit and card status (very high risk="HH", high risk="HI", medium risk="ME" and low risk="LO"). Naturally, CARD_ID is a unique key (and a unique index IDX is created on the CARD_ID column).

The summary table (HIGH_RISK_CARD) stores only those cards which are very high or high risk (i.e., with 'HH' or 'HI' values in the STATUS column). Typically, this summary table contains only a small subset of the rows (since there are not many high risk cardholders.) Also, a non-unique index IDX is created on CARD_ID, NAME and CREDIT columns of the summary table.

Consider the following query which returns cardholder names who have very high risk and yet high credit:

```
SELECT NAME
FROM CREDIT_CARD
WHERE STATUS='HH' AND CREDIT>150000
```

An optimizer function will consider many different alternatives during generation of the query execution plan and pick the the most efficient plan. When summary tables exist in the database, the optimzer now considers routing the original query to any applicable summary table. For the above query, the optimizer considers accessing the base table (CREDIT_CARD) as well as the summary table (HIGH_RISK_CARD).

During the generation of the query execution plan, additional information can be derived based on the query definition of summary tables and this additional information can be exploited for the optimizer function. For example, the non-unique index IDX, which is created on multiple columns of the summary table, is in fact unique because the column CARD_ID from the base table is selected according to the query definition of the summary table.

The present invention provides a method for deriving the index uniqueness. The approach builds on the techniques described in U.S. Pat. No. 5,615,361, entitled "Exploitation of Uniqueness Properties using 1-Tuple Condition for the Optimization of SQL Queries", issued Mar. 25, 1997, to Ting Y. Leung et al., which patent is incorporated by reference herein.

The approach can be explained as follows. The optimizer function examines the query definition of the summary table. For each column in the non-unique index on the summary table, the optimizer function determines if the column is materialized using a simple expression. The optimizer function identifies all these columns and invokes the generalized 1-TUPLE CONDITION function (as defined in U.S. Pat. No. 5,615,361, which is incorporated by reference herein) assuming that these columns were bound to constants. If the 1-TUPLE CONDITION function returns a "true" value, this means that these columns form a key and hence the non-unique index does not contain any duplicates, i.e., it is a unique index. It must be emphasized that the query definition of the summary table can be arbitrarily complex, and can include group by and/or having clauses.

The inputs to the method of the present invention comprise the following:
(1) A summary table (SI), i.e., a base table;
(2) The query definition (Q) of the summary table (ST), typically a SELECT-FROM-WHERE-GROUPBY query;
(3) A non-unique index (I) created on one or more columns on the summary table (ST).

The method of the present invention comprises the following steps:
(1) Find a set of bindings, denoted as BINDCOL, including constants that appear in the query definition Q.
(2) Find a set of columns, denoted as BCOL, that are assumed bound to a single constant value as follows:
    (a) A set of columns (BCOL) is initialized to empty,
    (b) For each column (C) used to create index I:
        (i) Find the corresponding column definition using Q;
        (ii) If the corresponding column definition in Q is HXP-strong, then add this column C into the BCOL set.
(3) Invoke the 1-TUPLE-CONDITION function, passing as parameters: the query Q, the BCOL set and the BINDCOL set. Upon completion, the 1-TUPLE-CONDITION function returns a "true" or "false" value indicating whether the 1-tuple condition exists or not. If the 1-TUPLE CONDITION function returns a "true" value, then the non-unique index I is in fact unique.

Using Example 1, the inputs to this method comprise:
(1) ST: HIGH_RISK_CARD.
(2) Q: SELECT*FROM CREDIT_CARD WHERE STATUS IN ('HH', 'HI').
(3) I:IDX FOR HIGH_RISK_CARD(CARD_ID, NAME, CREDIT).

Thus, the inputs to the 1-TUPLE_CONDITION routine comprise:
(1) Q:SELECT*FROM CREDIT_CARD WHERE STATUS IN ('HH', 'HI').
(2) BINDCOL: {'HH', 'HI'}.
(3) BCOL: {CARD_ID, NAME, CREDIT}.

This is, the column set {CARD_ID, NAME, CREDIT} contains a key (which is CARD_ID) and hence the non-unique index IDX is indeed unique.

EXAMPLE 2

Consider the following example:

```
CREATE TABLE SALES (
    SALES_ID INT,
    PRODUCT_ID INT,
    PURCHASE_DATE DATE,
    AMOUNT FLOAT);
CREATE TABLE SALES_BY_YM AS(
    SELECT YEAR(PURCHASE_DATE) AS YEAR,
        MONTH(PURCHASE_DATE) AS MONTH,
        SUM(AMOUNT) AS SUM, COUNT(*) AS
            COUNT
    FROM SALES
    GROUP BY YEAR(PURCHASE_DATE),
        MONTH(PURCHASE_DATE))
    DATA INITIALLY DEFERRED REFRESH IMMEDIATE;
CREATE INDEX SALES_IDX ON SALES_BY_YM
    (YEAR, MONTH;
```

Using the method of the present invention, the index SALES_IDX can be inferred as unique.

For Example 2, the inputs to the method comprise the following:
(1) ST: SALES_BY_YM.
(2) Q: SELECT YEAR(PURCHASE_DATE) AS YEAR, MONTH(PURCHASE_DATE) AS MONTH SUM (AMOUNT) AS SUM, COUNT(*) AS COUNT FROM SALES GROUP BY YEAR(PURCHASE_DATE), MONTH(PURCHASE_DATE).
(3) I:SALES_IDX FOR SALES_BY_YM(YEAR, MONTH.

Note that, during query rewrite optimization (for example, as described in the publication, Hamid Pirahesh, Joseph Hellerstein, and Waqar Hasan, "Extensible/Rule Based Query Rewrite Optimization in STARBURST," Proceedings of ACM SIGMOD '92 International Conference on Management of Data, San Diego, Calif., 1992, which is incorporated by reference herein), Q may be rewritten into the following equivalent query, SELECT YEAR, MONTH, SUM(AMOUNT), COUNT(*)
FROM TABLE (SELECT YEAR(PURCHASE_DATE), MONTH(PURCHASE_DATE), AMOUNT
FROM SALES)
AS Q(YEAR, MONTH, AMOUNT)
GROUP BY YEAR, MONTH With this equivalent query, the inputs to the 1_TUPLE_CONDITION routine comprise:
(1) Q':SELECT YEAR, MONTH, SUM(AMOUNT), COUNT(*) FROM TABLE (SELECT YEAR (PURCHASE_DATE), MONTH(PURCHASE_DATE), AMOUNT FROM SALES) AS Q(YEAR, MONTH, AMOUNT) GROUP BY YEAR, MONTH
(2) BINDCOL:{ }.
(3) BCOL: {YEAR, MONTH}.

Again, the 1_TUPLE_CONDITION function will return a "true" value and thus the index SALES_IDX is indeed unique. The rationale is that the non-unique index is defined on columns that contain all group by items in the query definition of the summary table.

In another scenario, where users explicitly reference the summary table, the optimizer can now generate a better alternative. For example, consider the following query, which returns the sales summary for December 1998:

SELECT*
FROM SALES_BY_YM
WHERE YEAR=1998 AND MONTH=12

The optimizer will consider using the index (SALES_IDX). With the derived uniqueness of this index, the optimizer can determine that at most one row will be returned to the users, and hence substantial saving in computation is achieved.

Finally, it should be emphasized that the query definition can be very complex and one may not be able to infer uniqueness just from a manual review of the definition, even though users may be allowed to manually create a unique index. The present invention is a more general approach for optimizing queries by deriving uniqueness based on the query definition of the summary table.

LOGIC OF THE PREFERRED EMBODIMENT

Figure 4:
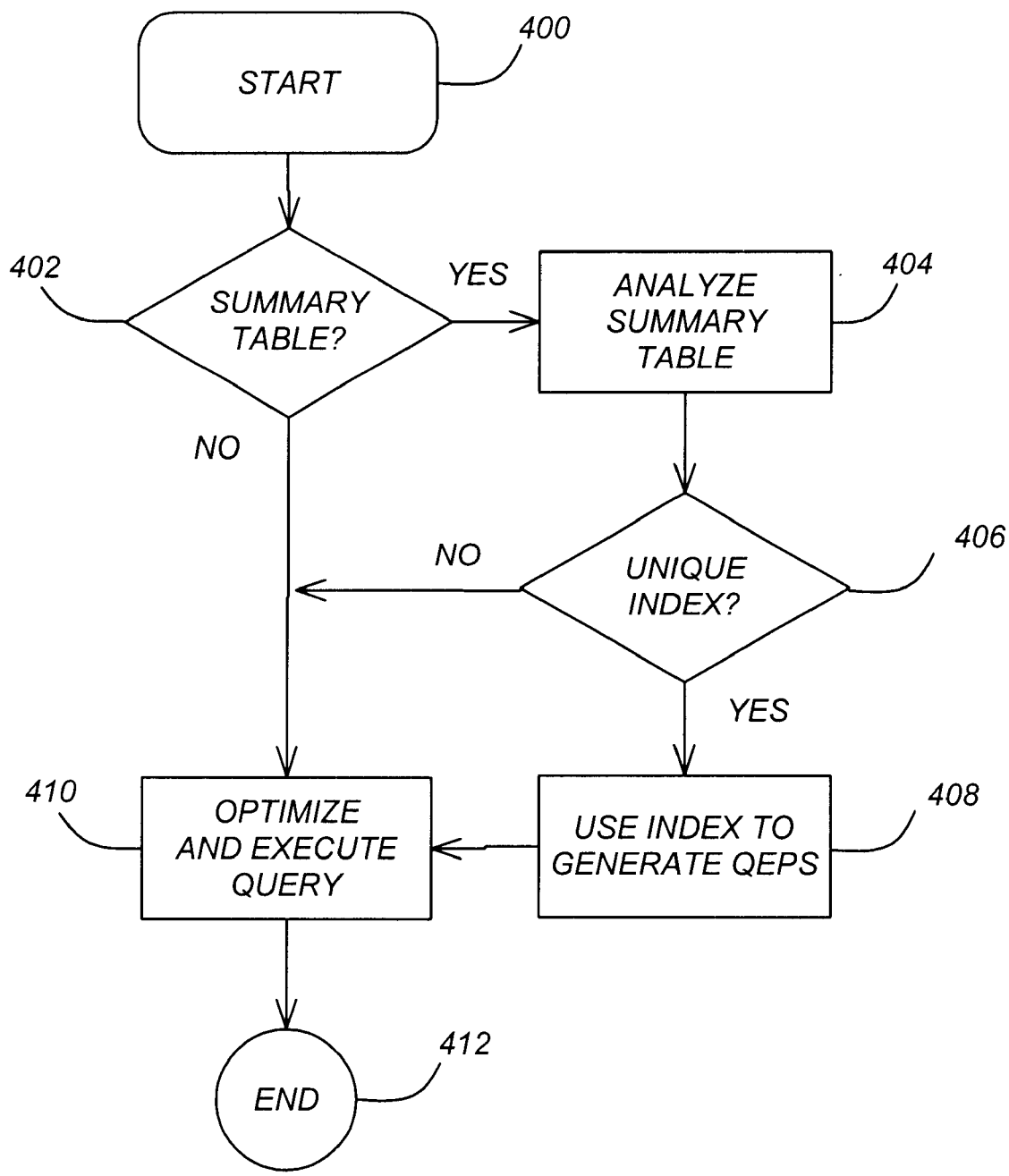
FIGS. 4 and 5 are flowcharts illustrating the logic of optimizing queries according to the preferred embodiment of the present invention.

FIG. 4 is a flowchart illustrating the logic of optimizing SQL queries in step 204 of FIG. 2 and step 312 of FIG. 3 according to the preferred embodiment of the present invention.

Block 400 represents the start of the logic by the RDBMS.
Block 402 is a decision block that represents the optimizer determining whether the query directly references one or more summary tables or materialized views, or whether one or more summary tables can be used to answer the query. If so, control transfers to Block 404; otherwise, control transfers to Block 410.

Block 404 represents the optimizer analyzing the summary table definition to determine whether an index of the summary table is unique based on a query definition for the summary table. This Block performs the logic described in FIG. 5.

Block 406 is a decision block that represents the optimizer determining whether the any non-unique index of the summary table is, in fact, unique. If so, control transfers to Block 408; otherwise, control transfers to Block 410.

Block 408 represents the optimizer identifying the non-unique index as unique, so that further query optimization can exploit this property.

Block 410 represents the RDBMS further optimizing and executing the query.

Finally, Block 412 represents the end of the logic.

Figure 5:
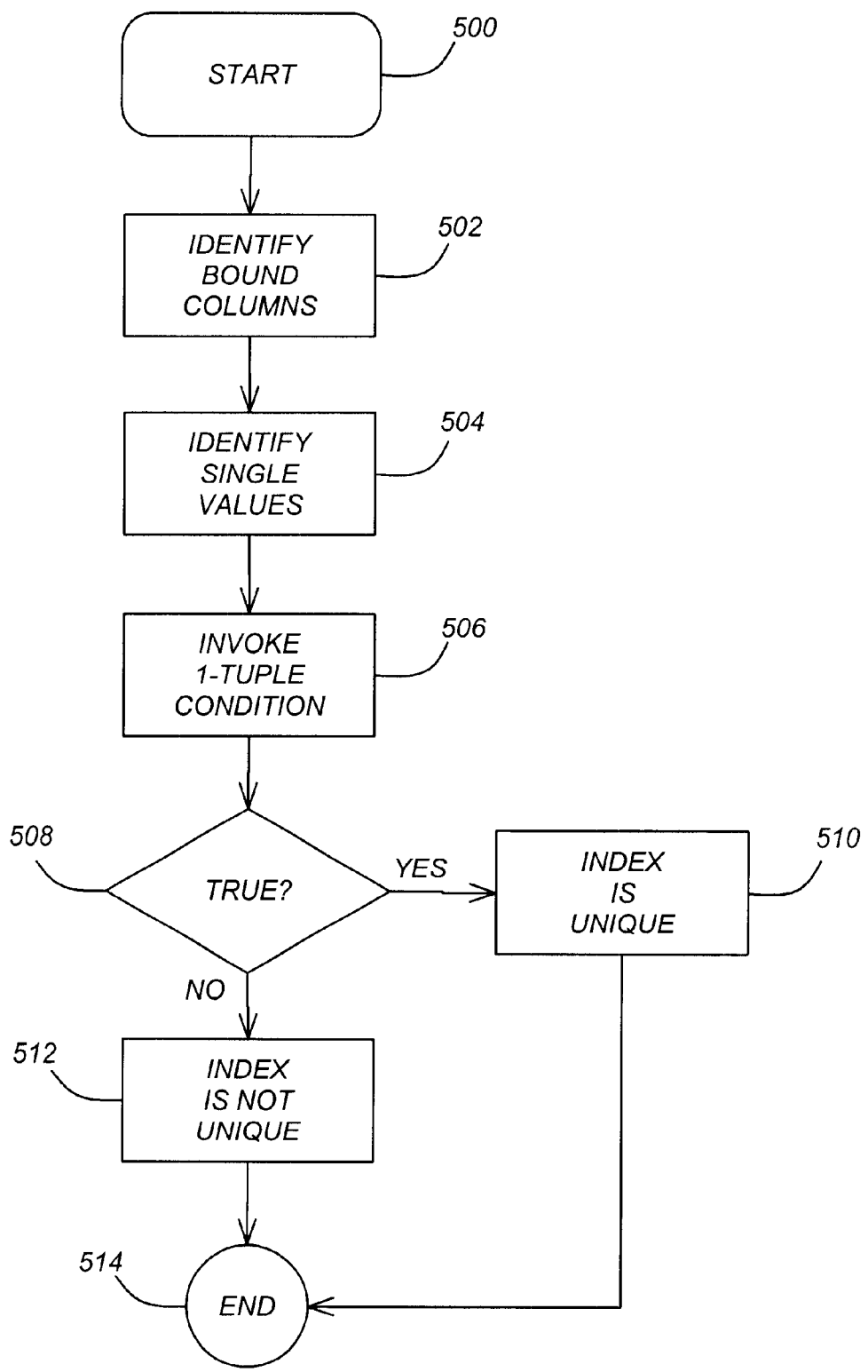

FIG. 5 is a flowchart illustrating the logic of the analysis performed by Block 404 of FIG. 4 according to the preferred embodiment of the present invention.

Block 500 represents the start of the logic by the RDBMS.

Block 502 represents the optimizer function of the RDBMS examining a definition of the summary table or materialized view to determine whether any columns referenced in the definition are bound. Specifically, this Block finds a set of bindings (BINDCOL), including constants, that appear in the query definition (Q) of the summary table (ST). A column may be bound, for example, to a constant value, a correlated column, or another column that is already bound.

Block 504 represents the optimizer examining the definition to determine whether any of the bound columns prohibit duplicate values in its associated table. Specifically, this step comprises the optimizer finding a set of columns (BCOL) that are assumed to be bound to a single constant value, as follows:
  (a) a set of columns (BCOL) is initialized to empty;
  (b) for each column (C) used to create the index:
    (i) finding the corresponding column definition using Q;
    (ii) if the corresponding column definition in Q is HXP-strong, as defined in U.S. Pat. No. 5,615,361, then adding this column C into the set (BCOL). The column is HXP-strong when the column reference is a simple or scalar expression, and no two different values from the column reference produce the same output column value.

Block 506 represents the optimizer invoking a generalized 1-TUPLE-CONDITION function for the set of columns in BCOL.

Block 508 is a decision block that determines whether the generalized 1-TUPLE-CONDITION function returns a "true" value. If so, control transfers to Block 510; otherwise, control transfers to Block 512.

Block 510 represents the 1-TUPLE-CONDITION function returning a "true" value, which indicates that the 1-tuple condition exists, and the index is unique. This Block indicates that the indexed columns form a key in the query definition of the summary table.

Block 512 represents the 1-TUPLE-CONDITION routine returning a "false" value, which indicates that the 1-tuple condition does not exist, and the index is non-unique. This Block indicates that the indexed columns do not form a key of the query definition of the summary table.

Finally, Block 514 represents the end of the logic.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method, apparatus, and article of manufacture for optimizing a query by deriving uniqueness for indices on the summary tables. The query is analyzed to determine whether a summary table can be used to answer the query or whether the summary table is directly referenced in the query. A determination is made whether a non-unique index of the summary table is unique based on a query definition of the summary table. If the index of the summary table is indeed unique, then the query can further be optimized using this property.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A method of optimizing a query in a computer system, the query being performed by the computer system to retrieve data from a database stored on the computer system, the method comprising:
   (a) determining whether a non-unique index of a summary table is unique based on a query definition of the summary table; and
   (b) generating at least one query execution plan using the non-unique index of the summary table, when the non-unique index of a summary table has been determined to be unique based on a query definition of the summary table.

2. The method of claim 1, further comprising analyzing the query to determine whether the summary table can be used to answer the query, and performing the determining step (a) when the summary table can be used to answer the query.

3. The method of claim 1, further comprising analyzing the query to determine whether the summary table is directly referenced in the query, and performing the determining step (a) when the summary table is directly referenced in the query.

4. The method of claim 1, wherein the generating step (b) further comprises generating a plurality of query execution plans that use query tables and summary tables, and unique and non-unique indexes on the query tables and summary tables.

5. The method of claim 4, further comprising selecting a most efficient one of the query execution plans and then executing the selected query execution plan.

6. The method of claim 1, wherein if the summary table can be used to answer the query, then rewriting the query to use the summary table.

7. The method of claim 1, wherein the determining step comprises:
   (1) for each column in the non-unique index, determining if the columns are materialized using a simple expression;
   (2) invoking a generalized 1-TUPLE-CONDITION function for a set of columns materialized using a simple expression, by assuming that the columns are bound to constants; and
   (3) if the 1-TUPLE-CONDITION function returns a true value for the set of columns, then the set of columns form a key in the query definition of the summary table and the non-unique index is indeed unique.

8. The method of claim 1, wherein the determining step comprises:
   (1) examining the query definition of the summary table to determine whether any columns referenced in the query definition are bound;
   (2) examining the query definition to determine whether a set of bound columns prohibit duplicate rows in the summary table; and
   (3) examining non-index columns of the summary table to determine whether the non-index columns form a unique key in the query definition of the summary table.

9. The method of claim 8, wherein the bound column is bound to a constant value.

10. The method of claim 8, wherein the bound column is bound to a column that is already bound.

11. The method of claim 1, wherein the determining step comprises:
    (1) finding a set of bindings (BINDCOL) including constants that appear in the query definition (Q) of the summary table (ST);
    (2) finding a set of columns (BCOL) that are assumed bound to a single constant value as follows:
       (a) a set of columns (BCOL) is initialized to empty,
       (b) for each column (C) referenced in the creation of the non-unique index (I) on the summary table ST:
          (i) finding the corresponding column definition using Q;
          (ii) if the corresponding column definition in Q is HXP-strong, then adding this column C into the BCOL set;
    (3) invoking the 1-TUPLE-CONDITION function passing as parameters: the query Q, the BCOL set and the BINDCOL set;
    (4) if the 1-TUPLE-CONDITION function returns a "true" value indicating that the 1-tuple condition exists, then the index I is unique; and
    (5) if the 1-TUPLE-CONDITION function returns a "false" value indicating that the 1-tuple condition does not exist, then the index I is non-unique.

12. The method of claim 11, wherein the column definition is HXP-strong when its head expression is a simple head expression, and no two different values from the column reference in the head expression produce the same output column value.

13. The method of claim 12, wherein the simple head expression contains only a column reference.

14. A computer-implemented apparatus for optimizing a query, comprising:
    (a) a computer system;
    (b) means, performed by the computer system, for determining whether a non-unique index of a summary table is unique based on a query definition of the summary table; and (c) means, performed by the computer system, for generating at least one query execution plan using the non-unique index of the summary table, when the non-unique index of a summary table has been determined to be unique based on a query definition of the summary table.

15. The apparatus of claim 14, further comprising means for analyzing the query to determine whether the summary table can be used to answer the query, and performing the means for determining (b) when the summary table can be used to answer the query.

16. The apparatus of claim 14, further comprising means for analyzing the query to determine whether the summary table is directly referenced in the query; and performing the means for determining (b) when the summary table is directly referenced in the query.

17. The apparatus of claim 14, wherein the means for generating (c) further comprises means for generating a plurality of query execution plans that use query tables and summary tables, and unique and non-unique indexes on the query tables and summary tables.

18. The apparatus of claim 17, further comprising means for selecting a most efficient one of the query execution plans and then executing the selected query execution plan.

19. The apparatus of claim 14, wherein if the summary table can be used to answer the query, then the query is rewritten to use the summary table.

20. The apparatus of claim 14, wherein the means for determining comprises:
   (1) for each column in the non-unique index, means for determining if the columns are materialized using a simple expression;
   (2) means for invoking a generalized 1-TUPLE-CONDITION function for a set of columns materialized using a simple expression, by assuming that the columns are bound to constants; and
   (3) if the 1-TUPLE-CONDITION function returns a true value for the set of columns, then the set of columns form a key in the query definition of the summary table and the non-unique index is indeed unique.

21. The apparatus of claim 14, wherein the means for determining comprises:
   (1) means for examining the query definition of the summary table to determine whether any columns referenced in the query definition are bound;
   (2) means for examining the query definition to determine whether a set of bound columns prohibit duplicate rows in the summary table; and
   (3) means for examining non-index columns of the summary table to determine whether the non-index columns form a unique key in the query definition of the summary table.

22. The apparatus of claim 21, wherein the bound column is bound to a constant value.

23. The apparatus of claim 21, wherein the bound column is bound to a column that is already bound.

24. The apparatus of claim 14, wherein the means for determining comprises:
   (1) means for finding a set of bindings (BINDCOL) including constants that appear in the query definition (Q) of the summary table (ST);
   (2) means for finding a set of columns (BCOL) that are assumed bound to a single constant value as follows:
      (a) a set of columns (BCOL) is initialized to empty,
      (b) for each column (C) referenced in the creation of the non-unique index (I) on the summary table ST:
         (i) means for finding the corresponding column definition using Q;
         (ii) if the corresponding column definition in Q is HXP-strong, then means for adding this column C into the BCOL set;
   (3) means for invoking the 1-TUPLE-CONDITION function passing as parameters: the query Q, the BCOL set and the BINDCOL set;
   (4) if the 1-TUPLE-CONDITION function returns a "true" value indicating that the 1-tuple condition exists, then the index I is unique; and
   (5) if the 1-TUPLE-CONDITION function returns a "false" value indicating that the 1-tuple condition does not exist, then the index I is non-unique.

25. The apparatus of claim 24, wherein the column definition is HXP-strong when its head expression is a simple head expression, and no two different values from the column reference in the head expression produce the same output column value.

26. The apparatus of claim 25, wherein the simple head expression contains only a column reference.

27. An article of manufacture embodying logic for performing a method for optimizing a query, the query being performed by a computer system to retrieve data from a database stored in a data storage device coupled to the computer system, the method comprising:
   (a) determining whether a non-unique index of a summary table is unique based on a query definition of the summary table; and
   (b) generating at least one query execution plan using the non-unique index of the summary table, when the non-unique index of a summary table has been determined to be unique based on a query definition of the summary table.

28. The method of claim 27, further comprising analyzing the query to determine whether the summary table can be used to answer the query, and performing the determining step (a) when the summary table can be used to answer the query.

29. The method of claim 27, further comprising analyzing the query to determine whether the summary table is directly referenced in the query; and performing the determining step (a) when the summary table is directly referenced in the query.

30. The method of claim 27, wherein the generating step (b) further comprises generating a plurality of query execution plans that use query tables and summary tables, and unique and non-unique indexes on the query tables and summary tables.

31. The method of claim 30, further comprises selecting a most efficient one of the query execution plans and then executing the selected query execution plan.

32. The method of claim 27, wherein if the summary table can be used to answer the query, then rewriting the query to use the summary table.

33. The method of claim 27, wherein the determining step comprises:
   (1) for each column in the non-unique index, determining if the columns are materialized using a simple expression;
   (2) invoking a generalized 1-TUPLE-CONDITION function for a set of columns materialized using a simple expression, by assuming that the columns are bound to constants; and
   (3) if the 1-TUPLE-CONDITION function returns a true value for the set of columns, then the set of columns form a key in the query definition of the summary table and the non-unique index is indeed unique.

34. The method of claim 27, wherein the determining step comprises:

(1) examining the query definition of the summary table to determine whether any columns referenced in the query definition are bound;

(2) examining the query definition to determine whether a set of bound columns prohibit duplicate rows in the summary table; and (3) examining non-index columns of the summary table to determine whether the non-index columns form a unique key in the query definition of the summary table.

35. The method of claim 34, wherein the bound column is bound to a constant value.

36. The method of claim 34, wherein the bound column is bound to a column that is already bound.

37. The method of claim 27, wherein the determining step comprises:

(1) finding a set of bindings (BINDCOL) including constants that appear in the query definition (Q) of the summary table (ST);

(2) finding a set of columns (BCOL) that are assumed bound to a single constant value as follows:

(a) a set of columns (BCOL) is initialized to empty;

(b) for each column (C) referenced in the creation of the non-unique index (I)on the summary table ST:

(i) finding the corresponding column definition using Q;

(ii) if the corresponding column definition in Q is HXP-strong, then adding this column C into the BCOL set;

(3) invoking the 1-TUPLE-CONDITION function passing as parameters: the query Q, the BCOL set and the BINDCOL set;

(4) if the 1-TUPLE-CONDITION function returns a "true" value indicating that the 1-tuple condition exists, then the index I is unique; and (5) if the 1-TUPLE-CONDITION function returns a "false" value indicating that the 1-tuple condition does not exist, then the index I is non-unique.

38. The method of claim 37, wherein the column definition is HXP-strong when its head expression is a simple head expression, and no two different values from the column reference in the head expression produce the same output column value.

39. The method of claim 38, wherein the simple head expression contains only a column reference.

* * * * *